J. R. McWANE.
PIPE FOUNDRY PLANT.
APPLICATION FILED MAR. 30, 1911.

1,035,374.

Patented Aug. 13, 1912.

WITNESSES

James R. McWane, INVENTOR,
BY

ATTORNEY

J. R. McWANE.
PIPE FOUNDRY PLANT.
APPLICATION FILED MAR. 30, 1911.

1,035,374.

Patented Aug. 13, 1912.
7 SHEETS—SHEET 4.

James R. McWane, INVENTOR,

WITNESSES

UNITED STATES PATENT OFFICE.

JAMES R. McWANE, OF BIRMINGHAM, ALABAMA.

PIPE-FOUNDRY PLANT.

1,035,374.      Specification of Letters Patent.      Patented Aug. 13, 1912.

Application filed March 30, 1911. Serial No. 618,015.

*To all whom it may concern:*

Be it known that I, JAMES R. MCWANE, a citizen of the United States, residing at Birmingham, in the county of Jefferson and State of Alabama, have invented a new and useful Pipe-Foundry Plant, of which the following is a specification.

The invention relates to improvements in pipe foundry plants.

The object of the present invention is to improve the construction of pipe foundry plants, and to remove the difficulties that have heretofore prevented the successful continuous operation of pipe plants.

In the usual style of pipe foundries, the core ovens are located on the side of the pit opposite the pipe runs. The cores are all given up to the cranes to be set into the molds in the pit, and after the iron is poured into the molds, the core bars are drawn by the crane in the pit and returned to the core makers at the same point at which they are given up. There is so much interference with the work of the core makers on account of having to give up the cores and to take care of the core bars on their return, that it is impossible to make the necessary cores in this space within the required time.

A further object of the invention is to provide a pipe foundry plant equipped with means, adapted, after the flasks have been shaken out, to deliver the pipes with the core bars therein to a remote portion of the plant where the core bars are pulled, and to carry the core bars back to the pit, and to perform the several steps in the preparation of the cores successively and without one gang or set of workmen interfering with the free operation of another set or gang, whereby ample space for the preparation of the desired number of cores is afforded and congestion at any point in the plant effectually prevented.

It is also the object of the invention to provide a foundry plant, adapted to be advantageously operated in duplicate, so that the several gangs of men or portions of said gangs may work back and forth from one plant to the other with great facility and advantage, thereby lessening the cost of operating foundry plants, and at the same time greatly increasing the out-put or tonnage of the same.

With these and other objects in view, the invention consists in the construction and novel combination of parts hereinafter fully described, illustrated in the accompanying drawings, and pointed out in the claims hereto appended.

In the drawings.

Like characters of reference designate corresponding parts in all the figures of the drawings.

The specification and drawings are a disclosure of one embodiment of the invention, while the claims define the actual scope of the invention.

In the accompanying drawings illustrating the preferred embodiment of the invention, the pipe foundry plant is shown in duplicate, the pipe pit, which is curved, having two sides A and B. Each side of the pipe pit is equipped with a centrally arranged crane 1 of the ordinary construction, and it is also provided adjacent to its outer wall with a curved series of heaters 2, forming drying tables and adapted to dry the flasks 3 after the same have been rammed. The pipe pit may be equipped at both its inner and outer walls with heaters, and the flasks may be rammed at a common point to form the sand molds, as shown and described in Patent, No. 955,423, granted to me Apr. 19, 1910, or by a jolting or jarring machine of any preferred construction, or they may be rammed over the heaters and at the pipe pit, as shown and described in Patent, No. 967,038, granted to me Aug. 9, 1910, which will save one handling of the flasks by the crane. The flasks, which are fully shown and described in Patent, No. 961,367, granted to me June 14, 1910, are shaken out over a shake-out box 4, described and claimed in my co-pending application, filed July 12, 1909, Serial No. 507,128, the pipes being pulled by the core bars and deposited upon a pipe run 5 with the core bars 6 within them. The core bars 6 may be equipped adjacent to their lower ends with bands, as shown and described in Patent, No. 967,039, granted to me Aug. 9, 1910, or they may be tapered upwardly, as disclosed in Patent, No. 967,041, granted to me Aug. 9, 1910, in order to enable the pipes to be pulled by the core bars.

The pipe runs 5 of the two systems or plants are arranged side by side in parallelism and extend to a point remote from the pipe pits at the outer end of each plant or system. While two plants or systems are illustrated in the accompanying drawings, it is not absolutely necessary to duplicate them, as one pipe pit with one crane and one system can be operated if desired. Each pipe run consists of a slightly elevated inclined track and the pipes with the core bars therein roll down the pipe run by gravity. The track bars or rails of the pipe runs may be supported in any desired manner; in the accompanying drawings they are arranged upon posts 7, which vary in length to obtain the desired grade or inclination of the pipe run.

Figure 2:
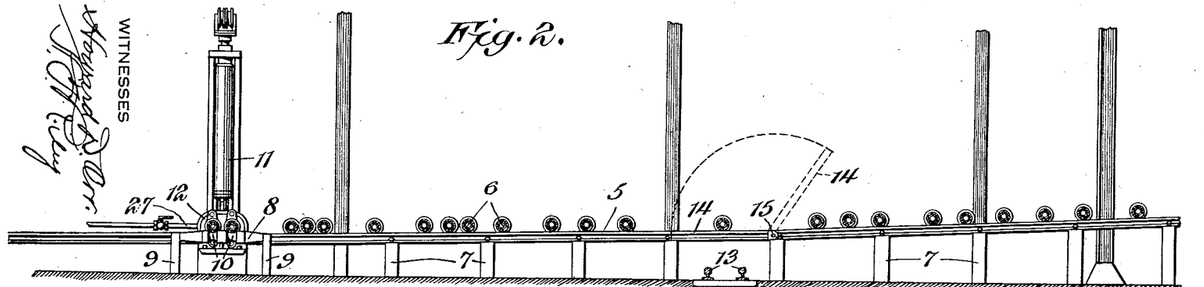
Fig. 2 is a longitudinal sectional view of a portion of the pipe foundry plant, taken substantially on the line 2—2 of Fig. 1.
Figure 3:
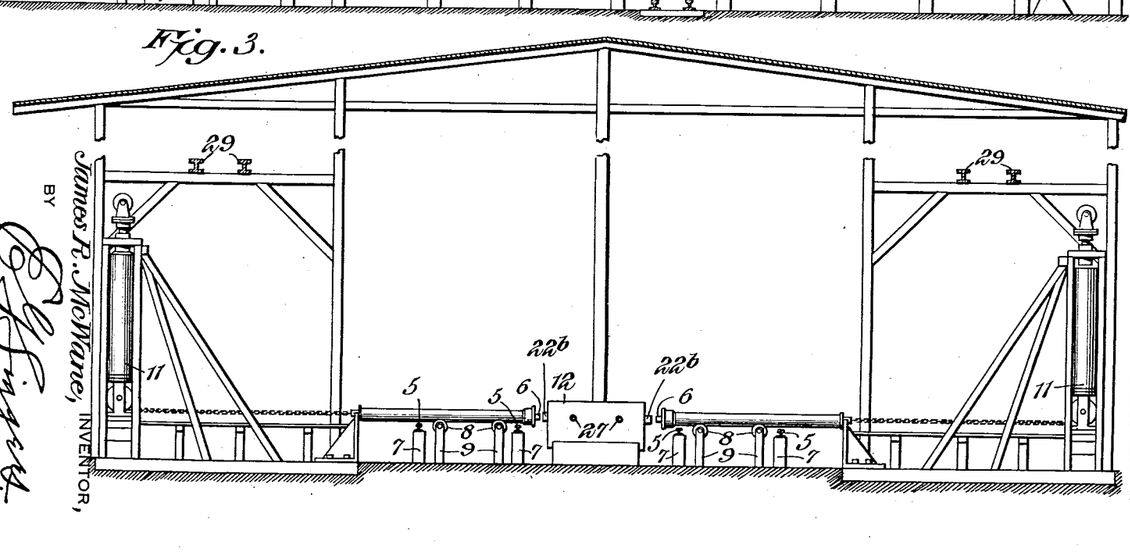
Fig. 3 is a transverse sectional view on the line 3—3 of Fig. 1.

The pipes of each pipe run roll onto a pair of pipe supporting rolls 8, located between the rails of the pipe run and extending longitudinally of the latter and journaled in bearings of suitable supports 9. The pipe supporting rolls, which are shown and described in said Patents, Nos. 967,039 and 967,041, granted to me Aug. 9, 1910, have tapered end portions to enable the pipes to be readily rolled on and off of them, and the said rolls 8, as clearly illustrated in Fig. 2 of the drawings, are provided at opposite sides of the center with annular centering grooves 10, adapted to aline the pipes with core pulling mechanism 11, which may be constructed as shown and described in the said Patents, Nos. 967,039 and 967,041. The core pulling mechanism 11 is located at the outer side of the pipe run of each of the systems or plants, and its operation is assisted by a hydraulic pipe pusher 12, located between the pipe runs of the two systems, so as to operate on the core bars of the pipes of each system, and disposed transversely with relation to the pipe runs. As the hydraulic pusher is adapted to coöperate with the pipe pulling mechanism of each system, there is a great advantage in duplicating the systems and arranging the pipe runs side by side in parallel relation. It will also be found advantageous in operating a plurality of duplicate or pairs of plant systems, and with this end in view, the track bars or rails of the pipe runs are provided above an intersecting supply track 13 with hinged sections 14, adapted to be swung back out of the way to permit a car or train to pass the pipe runs. The supply track is arranged on a lower level than the rails of the inclined pipe runs, and the rail sections 14 are provided at their upper ends 15 with hinges for permitting them to be swung out of the way.

Figure 10:
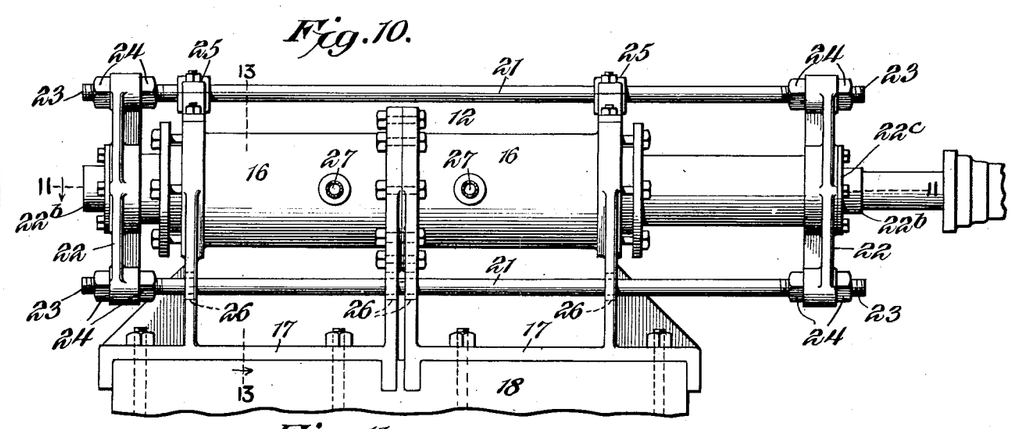
Fig. 10 is a side elevation of the hydraulic pusher.

The hydraulic pusher 12 comprises in its construction four cylinders 16, arranged in pairs, the members of each pair being preferably cast or otherwise formed integral with a supporting stand 17, shown consisting of a base and upright inner and outer transverse supporting portions, but the stand may be of any other preferred construction, as will be readily understood. The two stands 17 are arranged end to end, the cylinders of one stand being disposed in alinement with the cylinders of the other stand, and the inner upright portions of the stands, which are fitted against each other, as clearly illustrated in Fig. 10 of the drawings, are bolted or otherwise secured together. The stands are provided at the bottom or base with depending flanges, which engage and partially embrace a supporting block 18 to which they are secured, but they may be mounted in any other desired manner. The cylinders of the two stands are arranged in the same horizontal plane, and they are closed at their inner ends and they receive reciprocatory plungers 19 and are equipped at their outer ends with suitable stuffing boxes 20. The plungers are preferably hollow, being provided at their ends with reduced threaded openings for the reception of threaded plugs 19$^a$, having heads or flanges at their outer ends, which fit in recesses in the ends of the plungers. The plungers at each side of the hydraulic pusher are connected by upper and lower exteriorly arranged longitudinal rods 21, secured at their outer ends to vertical cross heads 22, which are mounted upon the outer ends of the plungers 19. The outer ends of the plungers are slightly reduced and are secured within central openings 22$^a$ of the cross heads, which carry horizontally projecting core bar engaging heads 22$^b$, provided at their inner ends with annular flanges of a diameter corresponding with the diameter of the reduced outer ends of the plungers and secured in the outer portions of the central openings 22ª of the cross heads by retaining rings 22ᶜ. The retaining rings 22ᶜ are provided with openings to fit the projecting portions of the heads 22ᵇ, and they engage the flanges at the inner ends thereof and are secured to the outer faces of the cross heads by screws, or other suitable fastening devices. The heads 22ᵇ, which strike the core bars, are preferably constructed of brass, but they may be made of any other suitable material.

Figure 11:
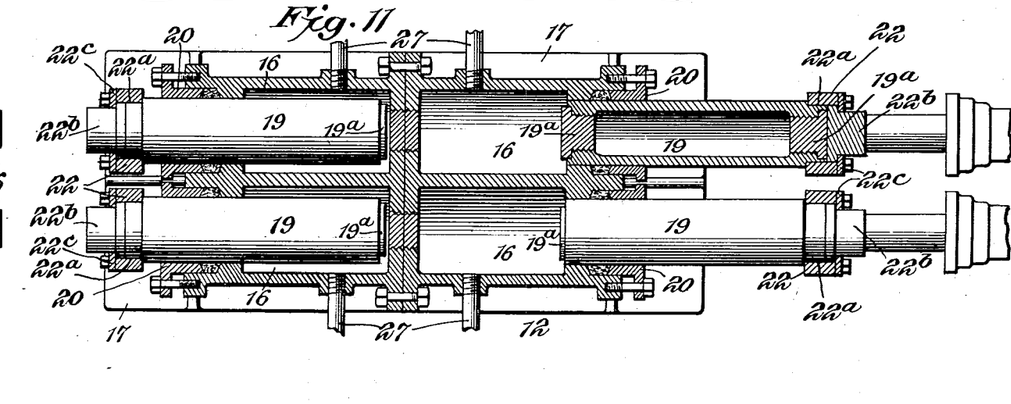
Fig. 11 is a horizontal sectional view on the line 11—11 of Fig. 10.
Figure 12:
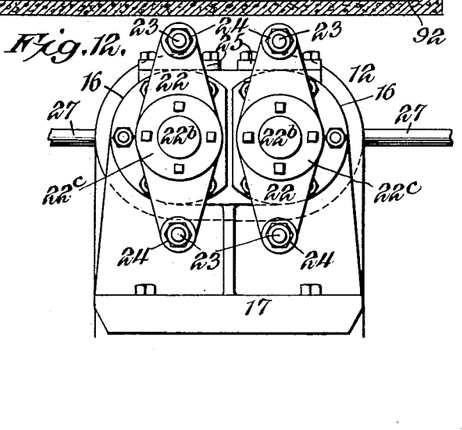
Fig. 12 is an end elevation of the hydraulic pusher.

The cross heads 22 extend upwardly and downwardly from the plungers, and the terminals 23 of the connecting rods 21 extend through suitable openings in the ends of the cross heads and are threaded for the reception of nuts 24, which engage the inner and outer faces of the cross heads. The stands are provided at the outer ends of the cylinders 16 with suitable bearings 25 for the reception of upper connecting rods, and the lower connecting rods pass through alined openings 26 in the upright supporting portions of the stands. The bearings 25 are located above the cylinders and carried by the outer supporting portions of the stands, and the alined openings 26 are located below the plane of the cylinders. The cylinders are provided at their outer sides with suitable ports 27 for the introduction and exhaust of water, or other motive fluid. The two sides of the hydraulic pusher are unconnected, as clearly illustrated in Figs. 11 and 12, and each side independent of the other side in action, and in practice a pair of pipes of one of the pipe runs with the core bars therein will be arranged on the pipe supporting rolls of such run in front of one end of the hydraulic pusher, and the latter will be operated simultaneously with the core pulling mechanism and will assist or supplement the action of the same, and will enable tight core bars to be easily pulled. The outward movement of one pair of plungers operates through the connecting rods 21 to move the other pair of plungers inwardly to return the same to a position to enable such plungers to operate on the core bars of a pair of pipes of the other pipe run. By this operation the hydraulic pusher alternately coöperates with the core bar pulling mechanism of the duplicate plants, but it will be readily understood that it may operate continuously on the core bars of either pipe run, it being of course necessary to actuate the plungers alternately so as to move the core bar engaging plungers inwardly after each pushing operation.

After the core bars have been pulled, the pipes and the core bars are cleaned. The pipes roll down the runway and are dipped, tested and weighed. The core bars are then acted upon by a series of independent mechanisms, operating in succession upon the core bars and performing the several steps in the preparation of the cores. The core bars are transferred to the first of these independent mechanisms, viz., a core bar turner 28 by a suitable overhead carrier, the track bars or rails 29 of which are indicated in dotted lines in Fig. 1 of the drawings, and in full lines in Fig. 2. The over-head carrier is designed to be of the usual construction employed in pipe foundry plants, and further illustration and description thereof are deemed unnecessary.

Figure 4:
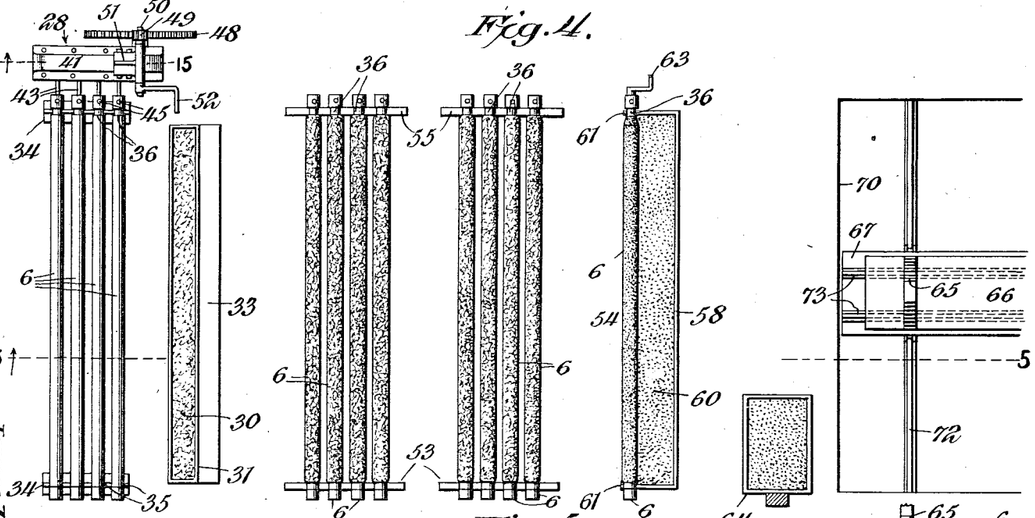
Fig. 4 is an enlarged plan view of a portion of the pipe foundry plant, illustrating the mechanism for applying the first and second coats to the core bars.
Figure 5:
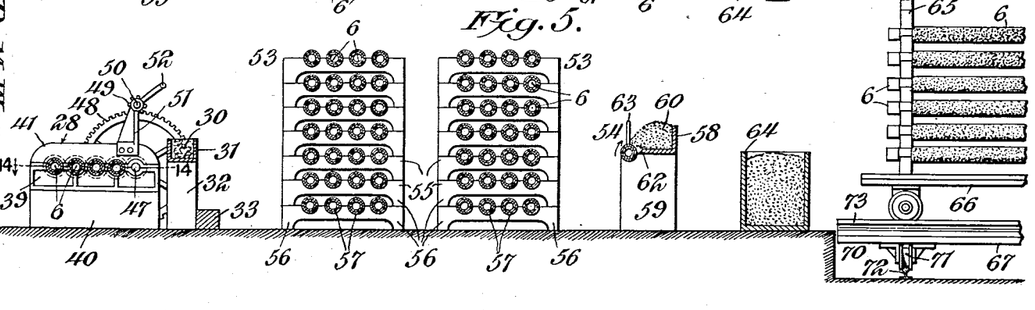
Fig. 5 is a sectional view on the line 5—5 of Fig. 4.
Figures 6, 14, 15:
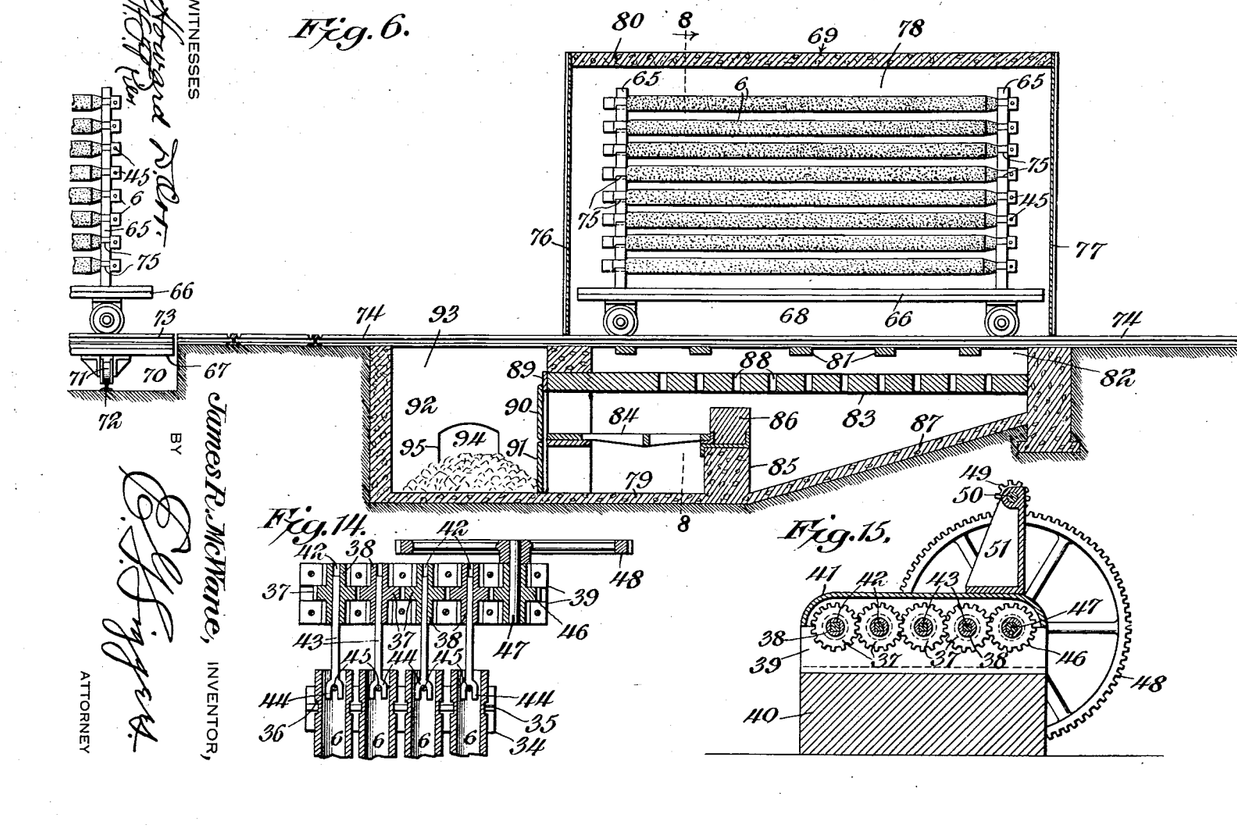
Fig. 6 is a longitudinal sectional view on the line 6—6 of Fig. 1.
Fig. 14 is an enlarged horizontal sectional view on the line 14—14 of Fig. 5.
Fig. 15 is a vertical sectional view on the line 15—15 of Fig. 4.
Figure 7:
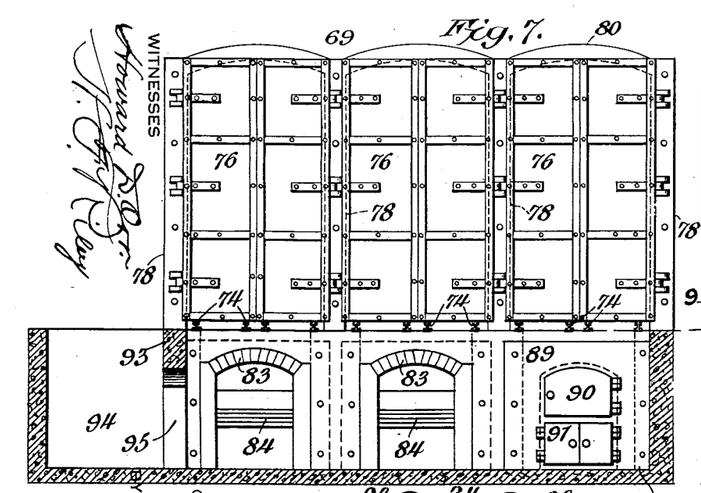
Fig. 7 is a transverse sectional view on the line 7—7 of Fig. 1.

The bar turner, which receives the core bars in a heated condition, is adapted to simultaneously rotate a plurality of core bars, while a first coating of "skilly" 30 is being applied to them. The word "skilly" is an arbitrary word and is used to convey the idea of any mixture that will adhere when thrown on a hot core bar and dry sufficiently to hold the second coating, and that contains a sufficient quantity of combustible material, such as manure, chopped hay, saw dust or the like, to burn out when the heat of the metal comes on the core and subsequently releases the core bar. The core bars are arranged close to one another in a horizontal position, as clearly illustrated in Figs. 4 and 5 of the drawings, and the "skilly" 30, which is contained within a trough 31, or other suitable receptacle, is thrown on the rotating core bars by hand, the surfaces of the series of core bars being completely exposed through such rotary movement. The trough 31 is supported in an elevated position at one side of the bar turner by end posts or supports 32, and a platform 33, consisting of a sill or beam, is preferably provided for the "skilly" men. The sill or beam is arranged upon the ground, or other supporting surface at the outer side faces of the posts or supports 32.

The core bars are supported in a horizontal position by spaced bearings 34, each consisting preferably of a horizontal base and a vertical web, provided in its upper edge with bearing recesses 35. The bearing recesses of the opposite bearings are arranged in alinement, and the core bars are provided at one end with an annular groove 36, receiving the vertical web of the contiguous bearing 34 and forming inner and outer shoulders, arranged to engage the inner and outer faces of the web of the bearing to prevent displacement of the core bars. The core bars are connected at one end with a horizontal series of meshing pinions 37, provided at opposite sides with extended hub portions 38, journaled in bearing recesses of spaced pedestals 39, mounted upon a suitable support 40. The pedestals are provided in their upper edges with the said bearing recesses, and the hub portions of the pinions 37 are exteriorly rounded to form journals, which are retained in the bearing recesses by a cap 41, mounted upon the pedestals and arching the space between the same and provided with laterally extending flanges or portions, which are suitably secured to the said pedestals. The laterally extending flanges or portions of the cap are curved to form bearing recesses to complete the bearings for the extended hub portions of the pinions or gears 37. The ends of the cap are curved downward partially around the end gears of the series.

The hubs of the gears 37 are provided with rectangular openings 42 to receive squared rods 43, having forked ends 44 and forming core bar engaging prongs or members. The forked ends 44 extend into the adjacent ends of the core bar and engage transverse pins 45 whereby the core bars are detachably interlocked with the projecting rods 43 of the gears. The squared rods are slidable in the openings of the gears, and they are adapted to be moved inwardly and outwardly to engage them with and disengage them from the transverse pins of the core bars.

The gear 37 at one end of the series meshes with a gear or pinion 46, keyed or otherwise secured to a short horizontal shaft 47, which is journaled in opposite bearings of the spaced pedestals. The shaft 47 projects beyond the outer pedestal and has a large gear 48, keyed or otherwise secured to it. The large gear 48 meshes with a pinion of an operating shaft 50, which is journaled in a suitable bearing of a bracket 51, mounted upon and straddling the cap 41 and suitably secured to the same. The pinion is keyed, or otherwise secured to the outer end of the operating shaft, which is provided at its inner end with a crank 52, located adjacent to one end of the "skilly" trough.

As four core bars are coated with "skilly" simultaneously with the multiple core bar turning device, the first coating is applied more rapidly than the second coating, which is put on the core bars one at a time. The core bars are placed upon racks 53 after they have received the first coating and while they are waiting to be transferred to a core strike 54. The core bars are carried by overhead hoist from the bar turning mechanism to the racks, which are composed of horizontal end sections 55, arranged one upon another, each section consisting of a metal bar or piece provided at its ends with depending feet 56, which spaces its body portion from the core bars of the next lower section. The sections 55 are provided with alined recesses 57, corresponding in number with the number of core bars operated on by the bar turning mechanism, and adapted to receive the same. The sections at one end of the rack engage the annular grooves 36 of the core bars, whereby they are interlocked with the same. This steadies the sections and the core bars and enables the sections to form a firm and stable support for the core bars. The sections of the racks arch the ends of the core bars of the adjacent lower sections, and the core bars are spaced both vertically and horizontally from one another by the racks, as clearly illustrated in Fig. 5 of the drawings.

The second coating, which is applied to the core bars in the ordinary manner by the core strike 54, is what is usually called in pipe foundry practice "loam". It is composed of clay and sand ground together with water, the proportions of clay and sand depending on the strength of the clay and the openness of the sand. The clay is used as a bond and the sand acts as a refractory to withstand the action of the heat. The core bars are hot when the "skilly" is put on, and the material, which dries quickly, has dried before the men, who put on the second coating, are ready to transfer the core bars to the core strike 54. The core strike 54, which is of the ordinary construction, consists of a receptacle 58, mounted upon suitable supports 59 and open at one side, and adapted to receive the loam 60, as clearly shown in Fig. 5 of the drawings. The supports 59 are provided with bearing recesses 61 receiving the end portions of the core bar, the groove of which is engaged with one of the supports, whereby the core bar is held against longitudinal movement in the bearings of the said supports. The bottom of the receptacle 58 is provided at the open side thereof with a suitable face 62, which smooths off the second coating. The bar is rotated in the direction of the arrow in Fig. 5 of the drawings by a crank 63, which is detachably engaged with one end of the core bar. A box 64 is arranged adjacent to one end of the core strike to contain a supply of loam or second coating.

Figures 8, 13:
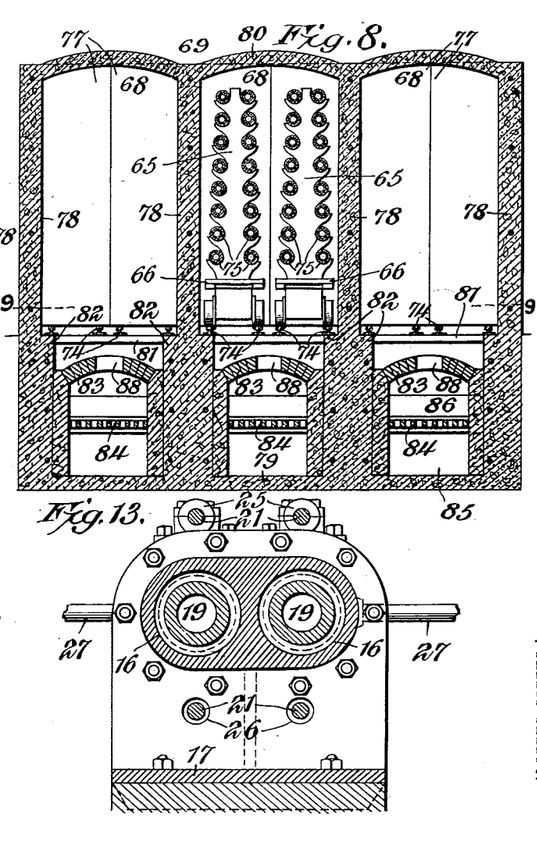
Fig. 8 is a transverse sectional view on the line 8—8 of Fig. 6.
Fig. 13 is a transverse sectional view on the line 13—13 of Fig. 10.
Figure 9:
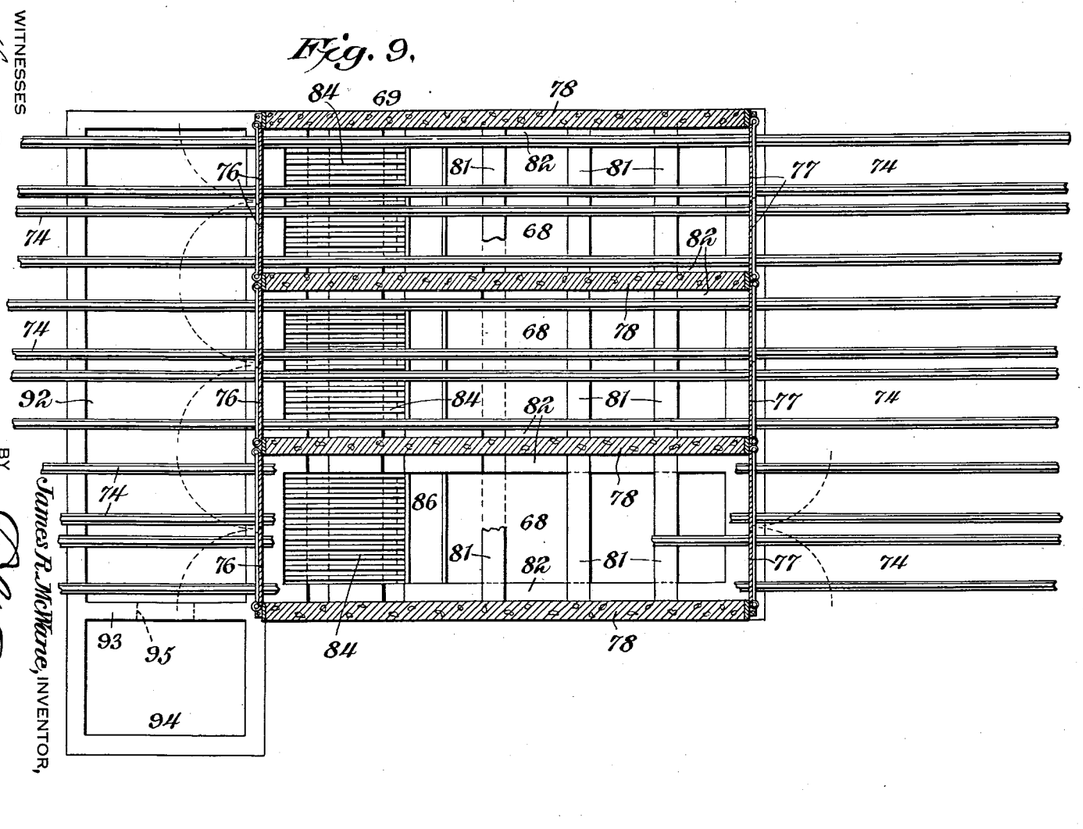
Fig. 9 is a horizontal sectional view on the line 9—9 of Fig. 8.

As soon as the second coating is applied to the core bar, the latter is removed from the core strike by the over-head hoist and is carried to and placed upon racks 65 of a core car 66, which is supported in a position beneath the over-head hoist or carrier by a transfer car 67, adapted to enable a core car to be taken from any one of the compartments 68 of a core oven 69 and arranged directly beneath the over-head hoist and return to the oven with a load of cores to be dried. The transfer car, which is located within a pit 70, may be of any preferred construction and is provided with transversely disposed wheels 71, arranged to run on rails 72 of a track, disposed transversely with relation to the compartments of the oven. The transfer car 67 is equipped with rails 73 and is movable from one end of the pit to the other to enable the rails 73 to be arranged in alinement with any of the rails of tracks 74 leading to the core oven. The transfer car may be arranged opposite any of the compartments of the oven, and the core car may be run onto the transfer car, which is then moved to a point directly beneath the over-head hoist, and after the racks of the core car have been filled with core bars, the core car is returned to the core oven for drying the cores. The racks 65 are composed of two upright supporting members, located at the ends of the core car and preferably tapered upwardly, as clearly illustrated in Fig. 8 of the drawings, and provided at their side edges with inclined bearing recesses 75, arranged in horizontal alinement and adapted to receive the end portions of the core bars, which are supported in spaced relation and thoroughly exposed to the drying action of the heat of the oven.

The core oven illustrated in the accompanying drawings is equipped with three compartments, each of a size to accommodate two core cars, but the core oven may be of any desired capacity to suit the size of the foundry plant. The tracks 74 extend entirely through the compartments of the oven and beyond the same, so that a car loaded with cores may be run into the oven at one end of a compartment, the cores dried and the car then run out of the oven at the other end of the compartment, suitable doors 76 and 77 being provided for closing the compartments of the oven.

The oven may be of any preferred construction and in the accompanying illustration, it is shown constructed principally of concrete, being composed of vertical concrete walls 78, a concrete bottom 79 and a concrete top 80. The rails of the tracks 74 extending through the oven are supported by metallic cross ties 81 laid on supporting ledges 82 of the walls. Beneath each compartment of the oven is arranged a suitable furnace, consisting of an arched top 83 of fire brick, a grate 84 and a bridge wall 85 supporting the grate at the back thereof. The arch 83 extends the entire length of the oven furnace and also entirely across the same from one side wall to the other. The furnaces of the core ovens are lined with fire brick. The lower portion of the bridge wall may be made of concrete and the upper portion 86 is constructed of fire brick, but the entire bridge wall may of course be made of the latter material. The rear portion 87 of the bottom of each furnace is inclined, as shown, for directing the heat upwardly and the arch 83 is provided at intervals with openings 88 for the passage of heat and the products of combustion. The furnace is provided with a cast iron front 89, and it has cast iron fuel and ash doors 90 and 91. The furnaces of the core oven are located below the level of the tracks 74 and a firing pit 92 is provided at the front of the furnace. The firing pit 92 is extended at one end and is provided with a division wall 93, forming a coke pit 94. Coke or other fuel for the supply of the furnace of the core oven is dumped into the coke pit 94, and the bridge 93 is provided at the lower portion with a door opening 95 to afford access to the contents of the coke pit. When the coke pit is filled, the fuel will flow through the door opening 95 and is in convenient reach of the workmen.

The tracks 74 extend beyond the outlet ends of the compartments of the oven to permit the core cars after the cores have been dried to be run out of the oven for touching up and blacking. This is done while the core bars are on the racks of the cars, which are returned to the oven for drying out the moisture resulting from the blacking and any final patches.

Figure 1:
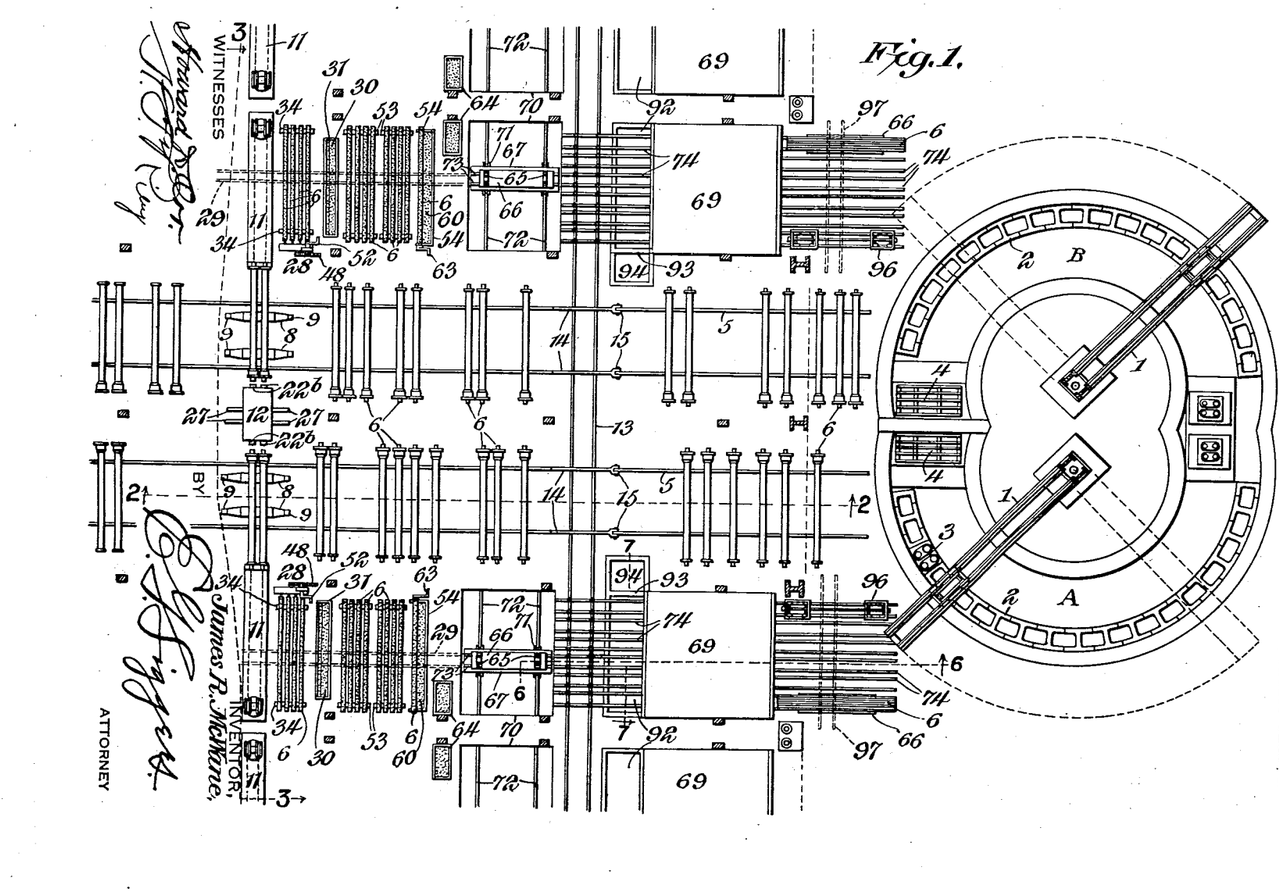
—Figure 1 is a diagrammatic plan view of a pipe foundry plant, constructed in accordance with this invention and arranged in duplicate.

When the cores are ready to be placed in the molds, they are first transferred to a core setting car 96 by the bogie of an over-head hoist or carrier of the ordinary construction, arranged transversely of the tracks 74, the rails 97 of the over-head hoist or carrier being indicated by dotted lines in Fig. 1 of the drawings. The core setting car, which is shown, described and claimed in Patent, No. 967,040, granted to me and William D. Moore, Aug. 9, 1910, is arranged on the end track nearest the pipe pit, or the adjacent track in order to be within the crane radius, and it is adapted to hold a plurality of cores in position for enabling the same to be simultaneously lifted and transferred from the core setting car to a multiple flask. When the cores are placed on the core setting car, they are within reach of the crane and they can be picked up from one to four at a time as desired, according to the size of the core and the style of the flask. When core bars are to be unloaded from the core car occupying the end track of the oven, the core setting car is transferred to the next track and the cores are brought out of the oven the same as from the other compartments; and the core setting car is transferred to the end track when cores are to be unloaded from the core car of the next adjacent track. In practice the core setting car will be made sufficiently light to enable it to be readily lifted from one of the tracks to the other.

The operation of the duplicate plants is as follows:—Assuming that work is started in the morning by beginning to set the cores on the A side of the pit, the flasks being already in position in the pit and the molds dried therein, a car of the cores is drawn from the oven and are taken one or two at a time and placed on the core setting car. When the cores are placed on the core setting car, they are within the crane radius and can be picked up from one to four at a time, according to the size of the core and the style of the flask. After the cores are set in the molds in the pit, and the iron, poured in the molds, is sufficiently cool, the flasks are carried by the crane to the shake-out box and are shaken out. The pipes are laid down upon the pipe run and rolled by gravity to the core bar pulling mechanism, which is assisted by the hydrulic pusher in the manner before explained. After the core bars are drawn, the pipes are rolled on for final cooling and cleaning, and the core bars are placed in the turning device and the first coating is applied, the heat from the core bars being sufficient to dry the first coating. After receiving the first coating they are placed on racks where they cool and dry. From this point they are conveyed one at a time by the over-head lift or carrier to the core strike where they receive the second or final coating of loam or mud. The lift or carrier then conveys the core bars to the core car, which has been drawn from one of the compartments of the oven onto the transfer car and moved to a position beneath the over-head lift or carrier. When the rack of the core car is filled, or the desired number of cores placed thereon, the core car is returned to its track and run into the core oven where the cores are thoroughly dried. After drying, the core cars are drawn out from the compartments of the oven for touching up and blacking. The core cars are then run back into the oven for driving out the moisture of any final patches and the blacking. This completes the circuit of the core bars, the cars of dry cores being drawn out as required and transferred by the over-head hoist to the core setting car as before explained.

In the operation of the duplicate plant, the men are divided into two gangs called a "casting gang" and "ramming gang." The casting gang begins work a sufficient length of time ahead of the ramming gang to set the cores in the flask, pour or "cast off the pit" and "shake out" a sufficient number of flasks to enable the rammers to work continuously without loss of time after they begin. While the ramming gang is ramming up the flasks on the A side of the pit, the casting gang is setting cores, pouring off and shaking out on the B side of the pit. The ramming gang goes to the B side of the pit after completing the A side, and the casting gang returns to the A side, the molds having been in the meantime dried and prepared for core setting and casting. This operation is kept up continuously, each gang alternating from one side of the pit to the other. The bar pullers and some of the core makers also work alternately from one side of the duplicate plant to the other. The system saves loss of time in drying the molds and greatly reduces the number of men necessary in the various operations, while at the same time it makes possible the continuous operation of the pit day and night with either two or three shifts of men.

The construction of the hydraulic core bar pusher, which co-acts with the core bar pulling mechanism, and the construction of the multiple bar turner, which rotates the core bars in a heated condition while the "skilly" is thrown on, are not claimed in the present application, as they form the subject-matter of separate co-pending applications.

Having thus fully described my invention, what I claim as new and desire to secure by Letters Patent, is:—

1. A pipe foundry plant including a pipe pit, a pipe run extending from the pipe pit to the outer end of the plant for conveying the pipes with the core bars therein to a point remote from the pipe pit, core bar pulling mechanism located at such point, and means for treating the core bars to prepare the cores as the core bars are returned to the pipe pit.

2. A pipe foundry plant including a pipe pit, an inclined gravity track extending from the pipe pit for conveying the pipes with the core bars therein to a remote portion of the plant, core bar pulling mechanism at such point, and means located at the side of the track and between the core bar pulling mechanism and the pipe pit for treating the core bars to prepare the cores as the core bars are returned to the pipe pit.

3. In a pipe foundry plant, the combination with a pipe pit, of a pipe run for delivering the pipes with the core bars therein to a point beyond the pipe pit, and a core bar pusher arranged alongside the pipe run transversely thereof and adapted to operate to loosen the core bars so as to permit the same to be more readily pulled.

4. In a pipe foundry plant, the combination with a pipe pit, of a pipe run for delivering the pipes with the core bars therein to a point beyond the pit, and a core bar pusher arranged alongside the pipe run in position to operate successively on the core bars within the pipes as the latter travel along the run.

5. In a pipe foundry plant, the combination with a pipe pit, of a pipe run for delivering the pipes with the core bars therein to a point beyond the pipe pit, and mechanism arranged alongside the pipe run in position to operate successively on the core bars within the pipes as the latter travel along the pipe run.

6. A pipe foundry plant including a pipe pit, a pipe run for delivering the pipes with the core bars therein to a point beyond the pipe pit, core bar pulling mechanism located at such point, and a core bar pusher arranged to operate in advance of the core bar pulling mechanism to loosen the core bars.

7. A pipe foundry plant including a pipe pit, spaced pipe runs for delivering the pipes with the core bars therein to a point beyond the pipe pit, core bar pulling mechanism located at such point, and a core bar pusher arranged between the said pipe runs in position to operate on the core bars of the pipes of either pipe run.

8. A pipe foundry plant including a pipe pit, spaced pipe runs extending from the pit to a remote portion of the plant, separate core bar pulling mechanism located at the outer side of each pipe run, and a core bar pusher located between the pipe runs and arranged to operate on the core bar of either run and to coöperate with each pipe pulling mechanism.

9. A pipe foundry plant including a pipe pit, spaced pipe runs extending from the pit to a remote portion of the plant, and a reciprocatory core bar pusher located between the pipe runs transversely of the same and movable in either direction to operate on the core bars of the pipes of either pipe run.

10. A pipe foundry plant including a pipe pit, a pipe run extending from the pipe pit to a remote portion of the plant for delivering the pipes thereto with the core bars in them, pipe pulling mechanism located at one side of the pipe run, and a core bar pusher located at the opposite side of the pipe run in position to loosen the core bars to enable the same to be readily removed by the core bar pulling mechanism.

11. In a pipe foundry plant, the combination of a pipe run or conveyer along which the pipes with the cores therein are caused to move, pipe pulling mechanism located at one side of the pipe run or conveyer and connected with one end of the core bars, and a core bar pusher located at the opposite side of the pipe run or conveyer to engage the other end of the core bars.

12. A pipe foundry plant including a pipe pit, means located at the pit for casting the pipes therein, a pipe run extending from the pipe pit to the outer end of the plant for conveying the pipes in a horizontal position with the core bars in them to a point remote from the pit, core bar pulling mechanism located at said remote point to pull the core bars from the pipes, and a series of independent mechanisms acting in succession upon the core bars after they are pulled to prepare the cores and return the same to the pipe pit.

13. A pipe foundry plant including a pipe pit, means located at the same for casting the pipes, a pipe conveying means extending from the pipe pit to the outer end of the plant for delivering the pipes with the core bars therein to a point remote from the pit, said conveying means maintaining the pipes in a horizontal position, a core bar pulling mechanism located at said remote point and operating in a horizontal plane to pull the core bars from the pipes, and a series of independent mechanisms spaced from the pipe conveying means and extending from the core bar pulling mechanism back to the pit for acting in succession upon the core bars after they are pulled so as to prepare the cores and return the same to the pit.

14. A pipe foundry plant including a pipe pit, means located at the same for casting the pipes, a pipe conveying means extending from the pipe pit to the outer end of the plant for delivering the pipes with the core bars therein to a point remote from the pit, said conveying means maintaining the pipes in a horizontal position, a core bar pulling mechanism located at said remote point and operating in a horizontal plane to pull the core bars from the pipes, and a series of independent mechanisms for coating the core bars and preparing the cores including the drying of the same, said mechanism acting in succession upon the core bars at a remote point from the pipe pit after the core bars have been pulled and serving to return the prepared core bars to the pipe pit.

15. A pipe foundry plant including a pipe pit having a crane, means located at the pit for casting the pipes, a pipe conveying means extending from the pipe pit to the outer end of the plant for delivering the pipes with the core bars therein to a point remote from the pit, said conveying means maintaining the pipes in a horizontal position, a core bar pulling mechanism located at said remote point and operating in a horizontal plane to pull the core bars from the pipes, and a series of independent mechanisms extending from a point remote from the pipe pit and back to the same, the first mechanism being located adjacent to the core bar pulling mechanism and receiving the core bars as they are pulled and each successive mechanism performing a step in the operation of preparing the cores, the last mechanism delivering the cores at a point within reach of the crane.

16. A pipe foundry plant including a pipe pit, means located at the same for casting the pipes, a pipe run extending from the pipe pit to the outer end of the plant for delivering the pipes with the core bars therein to a point beyond the pipe pit, said pipe run maintaining the pipes in a horizontal position, mechanism located at the pipe run for removing the core bars from the pipes, and a series of independent mechanisms spaced from the pipe run and extending from the core bar removing mechanism back to the pipe pit for acting in succession upon the core bars after they have been removed so as to prepare the cores and return the same to the pit.

In testimony that I claim the foregoing as my own I have hereto affixed my signature in the presence of two witnesses.

JAMES R. McWANE.

Witnesses:
D. W. WALLACE,
W. J. LYMAN.